June 15, 1926.
H. M. SVEBILIUS
1,589,307
RELEASABLE NUT FOR CLAMPS OR THE LIKE
Filed August 28, 1925
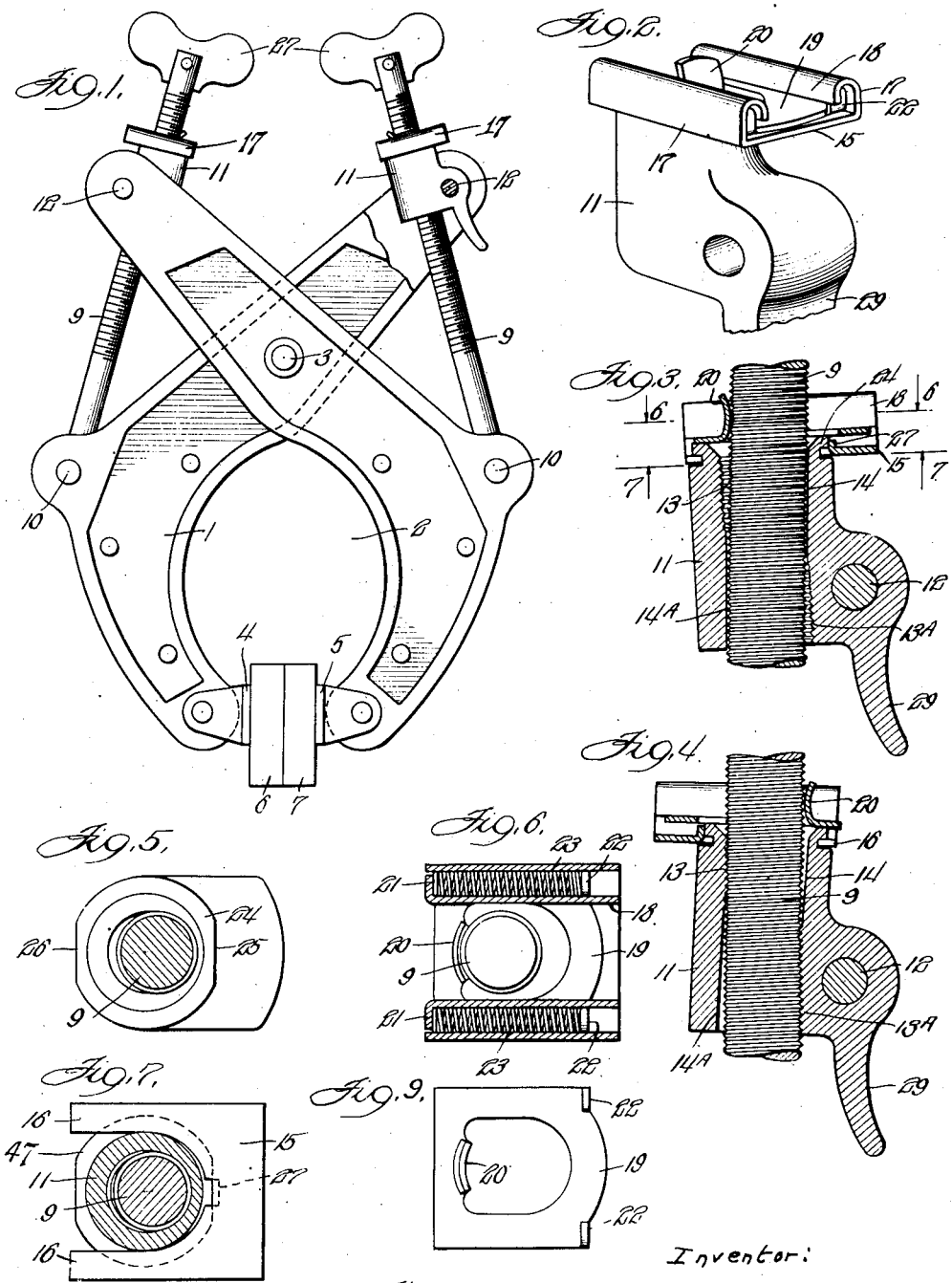
Inventor:
Henry M. Svebilius Patented June 15, 1926.

1,589,307

UNITED STATES PATENT OFFICE.

HENRY M. SVEBILIUS, OF EVANSTON, ILLINOIS.

RELEASABLE NUT FOR CLAMPS OR THE LIKE.

Application filed August 28, 1925. Serial No. 52,973.

My invention relates to releasable nuts adapted for use with threaded shanks to permit such shanks to be slid readily through the nuts when desired, and also to permit a speedy and positive re-engagement of the nuts with the shanks for affording an operative threaded connection between them.

For this purpose, my invention provides a pivotally mounted nut through which the threaded shank extends, provides threaded portions on the nut disposed for engaging the nut when the latter is in one position with respect to the shank, provides control means carried by the nut for rocking the nut about its pivotal mounting either into its said nut-engaging position or into a second position in which the shank is readily slidable through the nut, and provides simple means for yieldingly latching the control means so as to hold the nut in either one of its said positions. Moreover my invention provides an arrangement of this kind in which the control means can easily be manipulated manually, and in which the constituent elements of the control means can readily be assembled in operative position and attached to, or detached from, the nut without the use of tools. It also provides an arrangement for this purpose which will not interfere with the temporary releasing of the nut by a digital rocking of the nut when the control means are disposed for effecting the threaded connection. Still further and also more detailed objects will appear from the following specification and from the accompanying drawings, in which—

Fig. 1 is an elevation of a clamp employing my invention, with part of one lever cut away to show the disposition of one of the nuts.

Fig. 2 is an enlarged perspective view of the main portion of one of the nuts and of the control means mounted on the nut.

Fig. 3 is a central and longitudinal section taken through the nut, control means and a portion of the associated threaded shank in a plane at right angles to the pivot axis of the nut, showing the nut in a position in which it permits a sliding of the threaded shank through it.

Fig. 4 is a section similar to Fig. 3, but showing the nut rocked to the opposed position in which its thread engages that of the threaded shank.

Fig. 5 is a plan view of the nut, showing the threaded shank in the released position of Fig. 3.

Fig. 6 is a section taken through Fig. 3 along the line 6—6.

Fig. 7 is a section taken through Fig. 3 along the line 7—7.

Fig. 8 is an end view of the main part of the control member, taken from the right hand of Fig. 3.

Fig. 9 is a plan view of the slide which forms part of the control member.

In its immediate commercial applications, my invention is particularly suited for use in clamps, vises or the like where an adjustment is to be made between two spaced parts and where considerable time can be saved in the making of such adjustments if the nut associated with the threaded adjusting shank can be temporarily released so as to permit the shank to slide freely through it.

In U. S. Patent No. 1,515,286, issued to me Nov. 11, 1924 on a quick-adjustable clamp, I have shown pivoted nuts employed for such a purpose in connection with threaded shanks which operatively connect two interpivoted and jaw carrying members. In that patent I have shown each pivoted member as normally swung into threaded engagement with the corresponding threaded shank by a spring, and as adapted to be rocked by a digital pressure on one end of the nut for releasing it from such threaded engagement. In practice, this arrangement is not always convenient, as it requires the user of the clamp to maintain a digital pressure on the nut while making the quick-adjusting movement. In many cases, it is desirable to make this quick adjustment simultaneously for both of the threaded shanks, thereby obligating the user to employ both hands for this purpose and making it difficult for him to maintain a proper position of the pieces which are to be clamped to each other.

My present invention provides an arrangement whereby the nut can readily be held also in the position in which it permits a sliding of the threaded shank through it, thereby enabling the user to open or close the clamp readily by manipulating the jaw ends of the clamp which are closely adjacent to the work pieces that are to be clamped.

In the drawings, Fig. 1 shows a clamp including a pair of levers or main members 1 and 2 pivoted intermediate of their ends on a pin 3 and having their lower or jaw ends carrying jaws 4 and 5, which jaws are here shown as clamping blocks 6 and 7 between them. Pivoted to each of the said main members between the pivot pin 3 and the jaw end is an adjusting member which can be rotated by a handle 27 at its upper end. Each of these adjusting members includes a threaded shank 9 extending through a nut 11 which is rockingly mounted on a pivot pin 12 carried by the upper end of one of the said main members.

Each nut has a longitudinal bore formed by first providing two bores having axes intersecting near the middle of the nut at a sharply acute angle to each other, one of these bores corresponding to the outside diameter of the thread on one of the threaded shanks and the other to the diameter at the bottom of the thread, and then tapping out the latter bore. This produces two threaded bore portions 13 and 13$^A$ respectively adjacent to opposite ends of the nut and diametrically opposite each other, and two smooth and substantially semicylindrical bore portions 14 and 14$^A$ respectively opposite the said threaded portions 13 and 13$^A$. Consequently, the threaded shank extending through the nut will be in engagement with the threaded bore parts 13 and 13$^A$ when the nut is in the position of Fig. 4, but will be in engagement only with the smooth bore portions 14 and 14$^A$ when the nut is rocked to its releasing position of Fig. 3.

To effect a positive rocking of the nut to either of its said positions, I provide a control member mounted on the nut and including a spring-pressed part which continuously engages the threaded shank 9 extending through the nut and which will tilt the nut to either position of Fig. 3 or that of Fig. 4, according as the control member is in one or the other of two diametrically opposite positions. As here illustrated, this control member has a main part provided with a flat U-shaped base 15 affording a pair of webs 16 which slide in a peripheral groove 47 formed in the nut adjacent to its upper or head end, and a pair of riser webs 17 formed at opposite sides of the base 15 and recurved inwardly of the base so as to afford downwardly directed webs 18. These webs 18 terminate somewhat above the base portion 15, so as to allow room for the thickness of the head 24 of the nut and for a slide 19. This slide has a bore somewhat larger than the diameter of the threaded shank 9 and has a riser finger 20 continuously engaging the said shank. Each web 18 has a finger 21 at one end, and the slide 19 has a pair of fingers 22 at the opposite end.

Interposed between the fingers 21 and 22 at each side of the control member are compression springs 23 which continuously urge the slide in one direction longitudinally of the main part, or towards the bight in the base 15 of the latter, thereby retaining the bight in the groove 47 of the nut and pressing the finger 20 against the opposite side of the threaded shank. In so doing, the springs also tilt the upper portion of the nut away from the side of the shank against which the said finger bears. Hence, when the finger is over the upper threaded portion 13 of the nut as in Fig. 3, the nut will be rocked to the thread-releasing position of that figure and will be held in that position by the action of the springs. However, if the entire control member is rotated a half turn on the nut, the springs will rock the nut in the opposite direction, or to the position of Fig. 4 in which it effects a threaded engagement of the bore parts 13 and 13$^A$ with the threaded shank 9. To increase the effective pressure of the springs when they operate for holding the threaded nut parts engaged with the threaded shank, I preferably turn the groove 47 eccentric of the bore of the nut, with the axis of the groove closer to the upper threaded bore part than to the opposed smooth bore part. I also preferably make the nut of a softer metal than the threaded shank, so that the latter can gradually deepen the threads in the nut to compensate for wear.

To lock the rotatably mounted control member yieldingly in either one of its said positions, I desirably provide a portion of the nut adjacent to its said groove 47, such as the head 24 of the nut, with correspondingly located flattened portions 25 and 26 and provide the base 15 of the main part of the control member with a finger 27 which continuously engages the periphery of the head 24 and hence will engage the flattened portions 25 or 26 according as the control member is in the positions of Fig. 3 or Fig. 4.

By terminating the webs 18 at a suitable distance above the upper end of the nut, I permit the slide 19 to slide on the said upper net end, so as to be guided partly by the latter and partly by the said webs. A digital sliding of the slide 19 on the main part of the control member against the pressure of the springs increases the effective openings through these parts to a diameter greater than that of the head 24 of the nut, thereby permitting the entire control member to be attached to, or detached from, the nut without the use of tools. This facilitates the assembling of devices in which my invention is employed, and when the control member is attached to the nut the springs operate to retain it on the nut without requiring auxiliary fastening elements.

With the clamp of Fig. 1 thus equipped, the control members when in the position of Fig. 1 (which corresponds to that of Fig.

3) will readily permit a sliding of each nut on the corresponding threaded shank 9, thereby enabling the user to make a quick adjustment of the clamp to the work while handling both the work and the clamp from the jaw ends of the latter. As soon as he has done this, he rotates each control member a half-turn (thereby placing it in a position corresponding to Fig. 4) and can then manually tighten each shank further by manipulating the handles 29. Since the finger 27 readily snaps onto the flattened nut head portions to deter rotation of the control member on the nut, the clamp can be freely handled without danger of having the control members move out of their desired positions, thereby expediting the manipulation of the clamp and also preventing a stripping of the thread such as might occur if one of the shanks was tightened when the nut is in a position substantially intermediate of that of Figs. 3 and 4.

However, while I have illustrated and described my invention as employed in connection with a particular type of clamp, I do not wish to be limited to its use in such a connection. Neither do I wish to be limited to the details of construction and arrangement of my nut and control means as here disclosed, it being obvious that these might be varied in many ways without departing either from the spirit of my invention or from the appended claims. Moreover, my arrangement does not interfere with the digital rocking of the nut out of its thread-engaging position, as I can still provide the nut with a finger-piece or handle 29 for this purpose so as to permit the threaded connection to be temporarily released without rotating the control member on the nut.

I claim as my invention:—

1. The combination with a threaded shank of a nut through which the shank extends, the nut having a smooth bore portion and a diametrically opposed bore portion threaded to correspond to the thread on the shank, the nut being rockingly mounted to permit either its smooth bore portion or its threaded bore portion to be brought into engagement with the shank, and control means associated with the nut for rocking the nut so as to bring and hold either the smooth bore portion or the threaded bore portion in engagement with the shank.

2. A combination as per claim 1, in which the control means comprise a carrier member mounted on the nut and rotatable thereon, a presser member movable upon the aforesaid member transversely of the nut and having a portion engaging the shank, and means continually urging the presser member in one direction with respect to the carrier member.

3. A combination as per claim 1, in which the control means comprise a carrier member mounted on the nut and rotatable thereon, a presser member movable upon the carrier member transversely of the nut and having a portion continuously engaging the said shank, and means continually urging the presser member in one direction with respect to the carrier member, the nut and the carrier member having interengageable formations for resisting rotation of the control means upon the nut when the control means are holding the nut out of threaded engagement with the said shank.

4. A combination as per claim 1, in which the nut has a pair of oppositely disposed formations respectively engaged by the control means when the latter is holding the threaded and the unthreaded nut bore portion in engagement with the shank, the control means including a spring cooperating with the said formation for yieldingly retaining the nut in either of its said holding positions.

5. A combination as per claim 1, in which the control means comprise a carrier member mounted on the nut and rotatable thereon, a presser member movable upon the aforesaid member transversely of the nut, and means continually urging the presser member in one direction with respect to the carrier member, the last named means serving also to hold the entire control means in operative disposition upon the nut.

6. The combination with a threaded shank, of a nut through which the shank extends, the nut being pivoted on an axis transverse of the shank and having respectively threaded and unthreaded opposed bore portions, and control means for rocking the nut about its pivotal mounting to bring one or the other of the said portions into engagement with the shank; the said means comprising a carrier member rotatable on the nut and having a part engaging one side of the nut, a presser member engaging the opposite side of the shank, and spring means interposed between the said two parts for urging the said part toward the said shank.

7. A combination as per claim 6, in which the nut has a peripheral groove eccentric with respect to the bore of the nut, and in which the carrier member includes a forked portion having the prongs thereof extending through the said grooves at opposite sides of the nut and having its bight adapted to engage bottom portions of the said groove.

8. A combination as per claim 6, in which the carrier member is rotatable on the nut and attachable to the nut from one side of the latter, and in which the presser member is slidable on the said first named part.

9. A combination as per claim 6, in which the carrier member is rotatable on the nut and attachable to the nut from one side of the latter, and in which the presser member is slidable on the carrier member transversely of the axis of the nut, and in which the yielding means comprise a pair of springs interposed between the said two members, the two members having cooperating wall portions affording housings for the springs.

10. A combination as per claim 6, in which the presser member is slidably interposed between one end of the nut and portions of the carrier member.

11. A combination as per claim 6, in which the control means are arranged so as to be bodily detachable from the nut after a relative movement of the carrier and presser members against the resistance of the spring means.

12. The combination with a threaded shank, of a nut through which the shank extends, the nut being pivoted on an axis transverse of the shank and having respectively threaded and unthreaded opposed bore portions, and control means for rocking the nut about its pivotal mounting to bring one or the other of the said portions into engagement with the shank; the said means comprising a carrier member rotatable on the nut about an axis closer to that of the threaded nut bore portion than to that of the unthreaded portion, the carrier member having a part engaging one side of the nut, a presser member movable transversely of the nut and engaging the opposite side of the shank, and spring means interposed between the said two members for continuously pressing the said part of the carrier member against the said side of the nut and also pressing the presser member against the said opposite side of the shank.

Signed at Chicago, Illinois, August 20th, 1925.

HENRY M. SVEBILIUS.